May 30, 1933.  W. E. WENDT  1,912,051
ELECTRICAL APPARATUS
Filed July 25, 1929  3 Sheets-Sheet 1

Fig.1.

Inventor
Wesley E. Wendt
By Spencer, Hardman & Fehr
Attorney

Inventor
Wesley E. Wendt
By Spencer, Hardman & Fehr
Attorney

Patented May 30, 1933

1,912,051

UNITED STATES PATENT OFFICE

WESLEY E. WENDT, OF DAYTON, OHIO, ASSIGNOR TO DELCO-LIGHT COMPANY, OF DAYTON, OHIO, A CORPORATION OF DELAWARE

ELECTRICAL APPARATUS

Application filed July 25, 1929. Serial No. 380,921.

The present invention relates to electrical generating systems.

One of the objects of the present invention is to provide an improved electrical generating system which will supply current to a work circuit in an economic manner whether supplying a relatively small load or a relatively large load.

Another object of the present invention is to provide electrical generating systems which can be used individually for supplying current to a work circuit or can be combined so as to provide sub systems of a generating system. In carrying out this object I provide auxiliary mechanism which can be connected to a plurality of systems, each of which is capable of individual operation, and utilize the controls of the individual system in their normal manner for the controls of the main generating system.

The invention contemplates the use of a storage battery and a plurality of inter-related sub-electrical generating systems, of which the storage battery is adapted to supply the current demand to a predetermined value, while one of the inter-related sub-electrical generating systems is adapted to supply the current demand as the load demand increases, other sub-electrical generating systems coming into operation to supply the current demand when the system in operation has reached its capacity.

Another object of the present invention is to arrange for successively rendering the inter-related sub-electrical generating systems inoperative as the demand for current decreases.

Another object is to provide improved means for preventing the load demand by the work circuit and the load demand due to the starting operation of the systems from being applied simultaneously on the battery.

Another object is to provide improved means for operating any of the inter-related sub-electrical generating systems independently of one another.

Further objects and advantages of the present invention will be apparent from the following description, reference being had to the accompanying drawings, wherein a preferred form of the present invention is clearly shown.

In the present invention, I have provided a storage battery and a plurality of inter-related sub-electrical generating systems used ordinarily for house lighting, in which a storage battery is adapted to supply current to a predetermined value, any demand above said predetermined value is supplied by one of the inter-related sub-electrical generating systems and then in the event the demand for current exceeds the capacity of said system, other of the inter-related sub-electrical generating systems are rendered operative.

For the purpose of illustration, I have shown only two sub-electrical systems which provide a complete generating system and it is to be understood that any number of sub-electrical systems can be combined. One storage battery only is necessary which may be used to supply current for cranking the internal combustion engine or engines, if engines are used as the prime mover and which may be charged by any one or more of the sub-systems.

Figure 2:
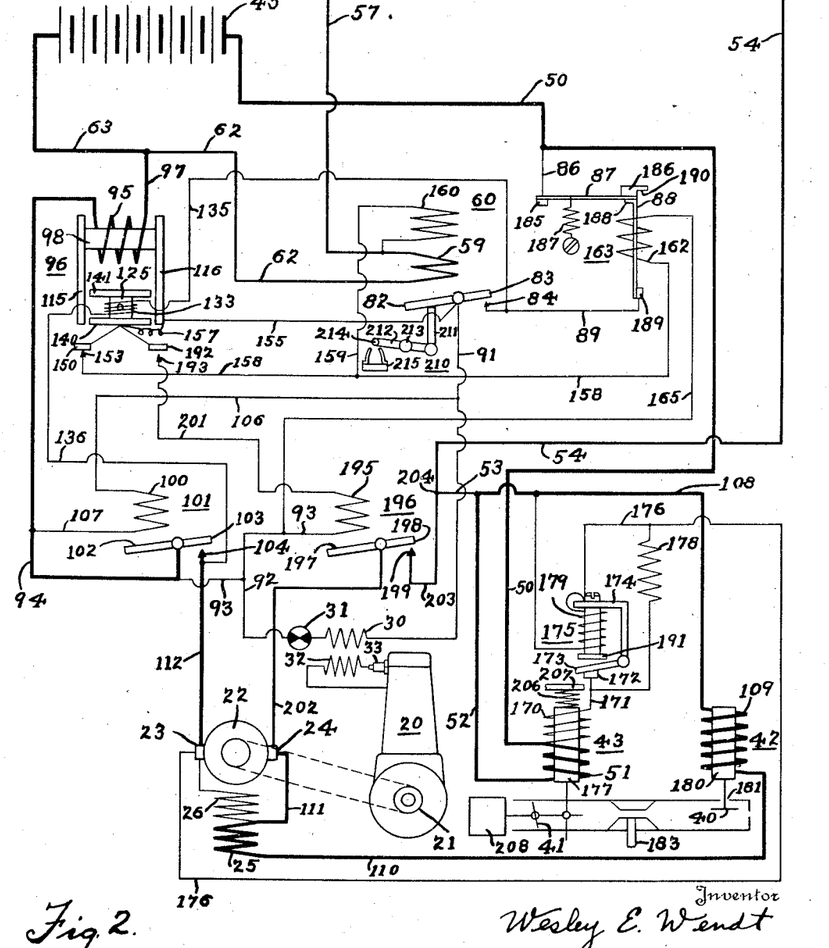
Fig. 2 is an enlarged view of system "A" shown in Fig. 1.
Figure 3:
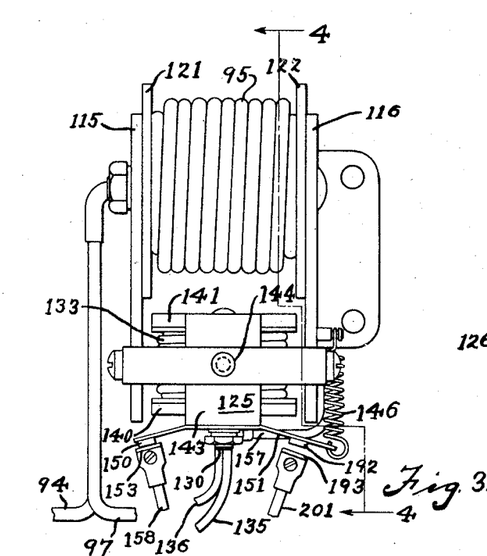
Fig. 3 is a front plan view of a reverse current relay.
Figure 4:
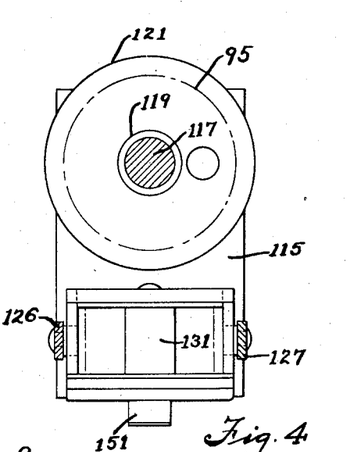
Fig. 4 is a sectional view of the reverse current relay taken on the line 4—4 of Fig. 3.
Figure 5:
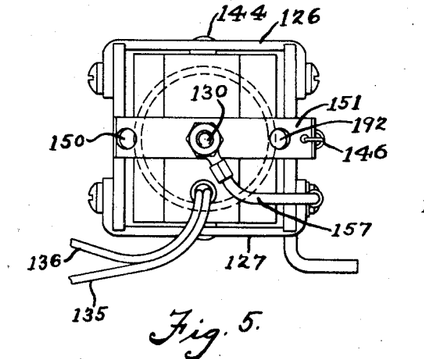
Fig. 5 is a bottom view in elevation of Fig. 3.

Referring to the drawings and more particularly to Fig. 2 showing an enlarged view of system "A", of the house lighting type, 20 designates a prime mover herein shown, for the purpose of illustration, as an internal combustion engine having a shaft 21 which drives an electrical apparatus or dynamo 22 having main brushes 23 and 24 connected with the armature of the dynamo and having a starting series field winding 25 and a shunt field winding 26.

The ignition apparatus comprises an ignition coil primary 30, an ignition timer 31 and an ignition coil secondary 32 which is connected with an engine spark plug 33.

A choke 40 for forming a proper mixture of gasoline and air for starting the prime mover, and a throttle 41 for regulating the speed of the prime mover, are adapted to be actuated by the controls 42 and 43 respectively.

The dynamo 22 functions as a motor and as a generator and is adapted to rotate the shaft 21 of the prime mover 20 when acting as a starting motor, receiving current from a storage battery 45. During the starting of the prime mover 20, the current through the series winding 25 and the shunt winding 26 is cumulative to produce a sufficient starting torque for cranking the prime mover.

Figure 1:
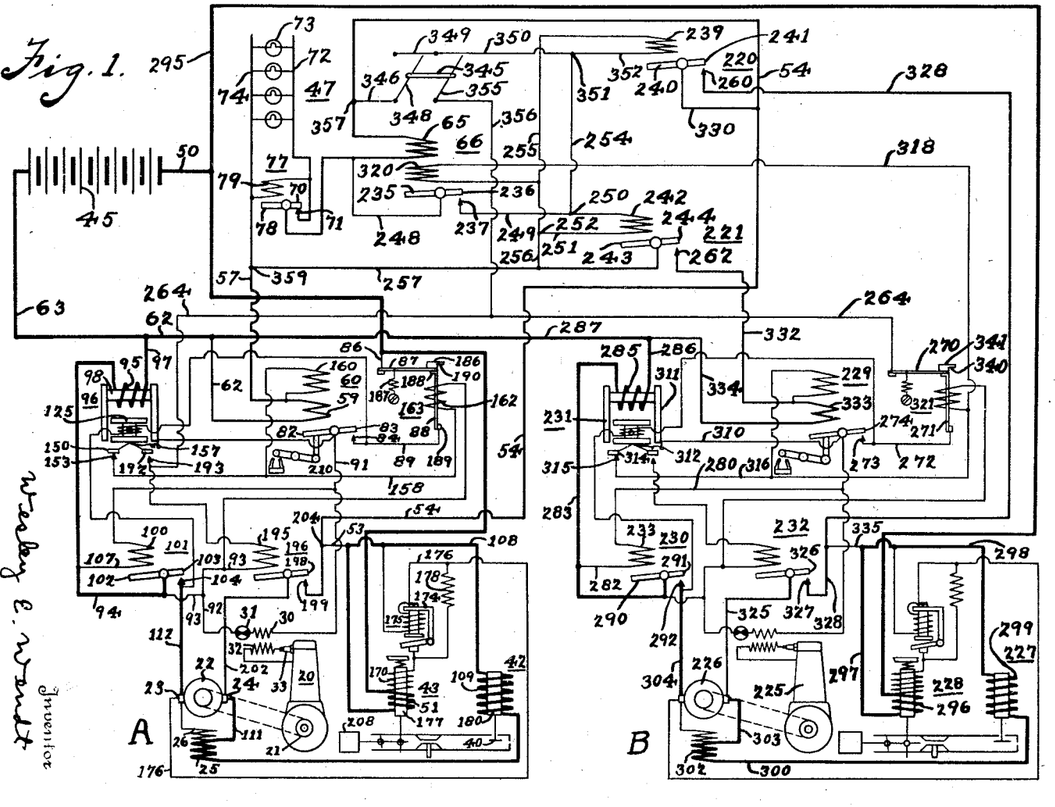
Fig. 1 is a wiring diagram illustrating the present invention showing two electrical generating systems designated generally as system "A" and system "B"

When the load demand of the service line 47 is less than a predetermined value the storage battery 45 is adapted to supply such demand. The current to the work circuit 47 will flow from the battery 45 through the following circuit: battery 45, wire 50, series winding 51 of throttle control 43, wire 52, wire 53, wire 54 which is connected to one of the service mains, the other service main being connected to wire 57, the current continuing to flow through series winding or current coil 59 of a starting switch relay 60 thence over wires 62 and 63 to the other side of the battery. The connections from wire 54 to wire 57 as described is used when the plant is installed using only one of the sub-electrical systems. If more than one of the sub-systems are used, for example 2, shown in Fig. 1, the current flows from wire 54 through series winding 65 of a main control relay 66 and through contacts 70 and 71, service main 72, translating device 73, service main 74, wire 57, series winding 59, wires 62 and 63 to the other side of the battery.

A low voltage cut-out 77 is adapted to separate contacts 70 and 71 when the voltage of the battery is abnormally low. The low voltage cut-out 77 includes a pivoted armature 78 which carries the contact 70, and a magnet coil 79 having its ends connected across the work circuit 47 in parallel with the translating devices. When the voltage of the battery is less than a predetermined low value, the coil 79 will not be energized sufficiently to hold the armature 78 in the position shown in Fig. 1. Thus the armature 78 will descend by gravity to separate the contact 70 from the contact 71, thereby interrupting the flow of current from the battery 45 to the work circuit 47. It is to be understood that if only one system is installed the voltage coil 79 can also be provided, the coil being connected between wires 54 and 57.

When there is a load demand for current by the work circuit 47 in excess of a predetermined value, for example 9 amperes, the ampere turns in the series winding 59 of the starting switch relay 60 are sufficient to lift the armature 82 upwardly to engage a contact 83 with a contact 84. The closing of contacts 83 and 84 allows current to flow from the battery 45 through the ignition and various other circuits necessary for rendering the prime mover 20 automatically operative to drive the dynamo 22 to suppply current to the work circuit 47 and battery 45. The circuit from the battery 45 to the ignition is as follows: battery 45, wire 50, wire 86, blade 87, bimetallic thermostatic blade 88, wire 89, contacts 84 and 83, wire 91, ignition coil primary 30, timer 31, wire 92, wire 93, wire 94, series winding 95 of a reverse current relay 96, wires 97 and 63 to the other side of the battery. The closing of contacts 83 and 84 also allows current to flow from the battery 45 to a magnet coil 100 of a starting switch 101. The starting switch 101 includes the coil 100 and a pivoted armature 102. The energizing of coil 100 causes the armature 102 to be drawn upwardly to engage contact 103 with a contact 104. The circuit from the battery to the coil 100 is as follows: battery 45, wire 50, wire 86, blades 87 and 88, wire 89, contacts 84 and 83, wire 91, wire 106, magnet coil 100, wire 107, wire 94, series winding 95 and wires 97 and 63 to the other side of the battery.

The closing of contacts 103 and 104 of the starting switch 101 establishes a cranking circuit between the battery and dynamo which is as follows: battery 45, wire 50, series winding 51 of control 43, wire 52, wire 108, winding 109 of choke control 42, wire 110, series field winding 25, wire 111, dynamo 22, wire 112, contacts 104 and 103, wire 94, series winding 95 and wires 97 and 63 to the other side of the battery.

The current flowing through the series winding 95 of the reverse curent relay 96 during cranking is adapted to magnetize the field frame 98 of relay 96 including side plates 115 and 116 whereby said plates will be, for example, north and south poles respectively. The relay 96 also includes a metal member 117 which carries an insulating bushing 119 on which there is wound the series winding 95. Suitable non-conducting end plates 121 and 122 are interposed between opposite ends of the winding 95 and side plates 115 and 116. The relay also includes a rocking armature 125. The rocking armature 125 includes a metal member 130 which carries an insulated bushing 131 on which there is wound a shunt winding 133, which winding is connected across the battery 45. The circuit from the battery 45 through the shunt winding 133 is as follows: battery 45, wire 50, wire 86, blades 87 and 88, wire 89, wire 135, shunt winding 133, wire 136, contacts 104 and 103, wire 94, series winding 95 of reverse current relay 96 and wires 97 and 63 to the other side of the battery. The armature 125 also includes side plates 140 and 141 which are held in position by the non-magnetic member 143 which is pivotally secured to the non-magnetic members 126 and 127 by the studs 144. The side plates 140 and 141 are adapted to be magnetized north and south poles respectively by the shunt winding 133. When no current is flowing in the windings 95 and 133, armature 125 is in the position shown in Fig. 1, it being resiliently held in such position by a spring 146. When the current flows through the series winding 95 during cranking like poles of the relay frame and armature will repel to further assist in maintaining the rocking armature 125 in the position shown in Fig. 1, whereby contact 150 which is carried by the metal member 151 which member is secured to the non-magnetic member 143 will maintain its contact with a contact 153.

Engagement of contacts 150 and 153 allows current to flow from the battery through the following circuits when contacts 83 and 84 of relay 60 are closed: battery 45, wire 50, wire 86, blades 87 and 88, wire 89, contacts 84 and 83, wire 155, relay side plate 116, wire 157, metal member 151, contacts 150 and 153, wire 158, wire 159, shunt winding or holding coil 160 of relay 60, then back to the opposite side of the battery through winding 59, wires 62 and 63; also current flows from wire 158 through a heating coil 162 of a cranking cut-out 163, wires 165, 93 and 94, the series winding 95 and wires 97 and 63 to the opposite side of the battery. During cranking operation the current flows through the shunt winding 160 of relay 60 to cooperate with the series winding 59 to insure maintaining of contact between contacts 83 and 84. During cranking operation a heavy demand on the battery tends to reduce the ampere turns of the series winding 59 of relay 60, and would cause a chattering of contacts 83 and 84 if it were not for the shunt winding 160.

The control 43 also includes a shunt winding 170 which is connected across the battery 45, the circuit from the battery 45 through the shunt winding 170 is as follows: battery 45, wire 50, shunt winding 170, wire 171, contact 172, armature 173 and frame 174 of a voltage limiting relay 175, wire 176, wire 112, contacts 104 and 103, wire 94, series winding 95, and wires 97 and 63 to the other side of the battery. When the prime mover 20 is cranking, the current from the battery flows from the series winding 51 and the shunt winding 170 in the same direction. During cranking and when the current is flowing in the same direction in these two windings 51 and 170, the series winding is adapted to cooperate with the shunt winding to raise the control plunger 177. The combined effort of these two windings tends to open the throttle 41 to its fullest extent which is desirable for good starting.

The flow of current through the magnet coil 109 of the choke control 42 tends to raise the control plunger 180 upwardly which plunger carries the choke 40. The upward movement of the plunger 180 will cause the choke 40 to shut off the air passage 181, thus decreasing the quantity of air and consequently allowing a greater volume of gasoline to pass through the pipe 183 and into a carburetor to thus provide a relatively rich starting mixture for the engine. The control 42 is adapted to function for a short interval, namely, only when a heavy demand for current is made on the battery 45 during cranking which heavy demand is present for a short interval.

Thus where there is a demand for current of a predetermined value by the work circuit 47 the prime mover 20 will be started by supplying ignition thereto and cranking by the starting series field 25 in conjunction with the shunt field 26 of the dynamo 22.

If the prime mover 20 should not start within a certain length of time, abnormal discharge of the battery is prevented by the cranking cut-out 163 which includes the blade 87 and the bimetallic thermostatic blade 88. The blade 87 is fixed at 185 and has a non-conducting block 186 secured thereto. The blade 87 is urged downwardly by a spring 187 to engage the flanged end 188 of the bimetallic thermostatic blade 88, said blade being fixed at 189. The thermostatic blade 88 is in heat receiving relation to the heating coil 162. While the engine is cranking, current is passing through the heating coil as previously described. If the cranking of the engine should continue for an abnormal period, for example one to two minutes, the thermostatic blade 88 will be heated sufficiently to cause it to bow to the right, as viewed in the drawing, until the flanged end 188 moves to the right far enough to break its engagement with the blade 87 and is then retained in a shoulder 190 of the non-conducting block 186 by the downward movement of the blade 87. The separation of blades 87 and 88 will interrupt the flow of current to the ignition, shunt 160 of relay 60, shunt winding 133 of relay 96, heating coil 162 of cranking cut-out 163 and magnet coil 100 of the starting switch 101. When coil 100 is deenergized the armature 102 will descend by gravity to separate contacts 103 from contact 104, thus the starting circuit will be interrupted.

Figure 6:
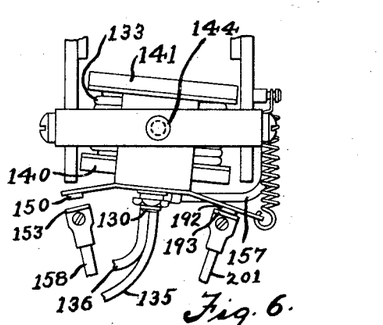
Fig. 6 is a fragmentary view of the reverse current relay showing the armature tilted in generating position.

During normal operation, when the prime mover becomes self operative and attains a certain speed the dynamo 22 will function as a differentially wound generator, the current flowing from the dynamo to the battery over the cranking circuit. The current flowing through the series winding 95 of the reverse current relay 96 will be reversed from that during cranking, since this winding is in series with the dynamo 22 and the battery 45. This causes a reversal of magnetism in the relay side plates 115 and 116 and consequently the like pole of the armature side plates 140 and 141 will be moved away from the like poles of the relay side plates 115 and 116 causing the armature 125 to pivot and to separate contact 150 from contact 153 and assume the position shown in Fig. 6, thereby causing contact 192 to engage a contact 193. Thus the flow of current through the heating coil 162 and shunt winding 160 of relay 60 will be interrupted, the contacts 83 and 84 of relay 60 then being controlled entirely by the series winding 59.

The closing of contacts 192 and 193 allows current to flow from the dynamo 22 to a magnet coil 195 of a series field shorting switch 196. The switch 196 also includes an armature 197 which carries a contact 198. The energizing of coil 195 will draw the armature 197 upwardly to engage contact 198 with a contact 199. The current from the dynamo 22 to the magnet coil 195 is as follows: dynamo 22, wire 111, series winding 25, wire 110, magnet coil 109 of control 42, wire 108, wire 52, series winding 51 of control 43, wire 50, wire 86, blades 87 and 88, wire 89, contacts 84 and 83, wire 155, relay side plate 116, wire 157, metal member 151, contacts 192 and 193, wire 201, magnet coil 195, wire 93, contacts 103 and 104 and wire 112 to the other side of the dynamo.

The closing of contacts 198 and 199 allows current to flow from the brush 24 of the dynamo 22 through wire 202, contacts 198 and 199, wire 203 which joins with wires 53 and 54 at connecting point 204 and thus short circuits the series field 25 of dynamo 22 and the choke coil 109 of control 42, since the circuit just described offers less resistance than the circuit through the series field 25 and coil 109.

The dynamo 22 then functions as a shunt wound generator and supplies current to the translating devices 73 in the work circuit 47 and supplies charging current to the battery 45. The flow of current from the dynamo 22 through the work circuit is as follows: dynamo 22, wire 202, contacts 198 and 199, wire 203, wire 54, series winding 65 of main control relay 66, contacts 70 and 71 of low voltage cut-out 77, service main 72, translating device 73, service main 74, wire 57, series winding 59 of starting switch relay 60, wires 62 and 97, series winding 95, wire 94, contacts 103 and 104 and wire 112 to negative side of the dynamo. The flow of current from the dynamo 22 to the battery charging circuit is as follows: dynamo 22, wire 202, contacts 198 and 199, wire 203, wire 53, wire 52, series winding 51 of control 43, wire 50, battery 45, wire 63, wire 97, series winding 95, wire 94, contacts 103 and 104, wire 112 to negative side of the battery.

When the dynamo 22 is operative to supply current to the battery 45 and the work circuit 47, the flow of current through the series winding 51 of the throttle control 43 is reversed from that during cranking. The series winding 51 then tends to draw the plunger 177 downwardly to close the throttle 47. Since the shunt winding 170 of control 43 is connected across the battery, the current always flows in this winding in the same direction. Therefore the shunt winding 170 will always tend to raise the plunger 177 upwardly to open the throttle 41. In actual practice the series winding 51 is wound around the shunt winding 170 but for the sake of illustration the shunt winding 170 is shown above the series winding 51.

The control 43 also includes the coiled spring 206 interposed between the upper portion of the plunger 177 and the control housing 207, and includes a weight 208. The shunt winding 170 tends to raise the plunger 177 upwardly opposing the tension of the spring 206. The weight 208 is arranged to slightly overbalance the plunger 177 and hold the same in contact with spring 206 when the windings 51 and 170 are deenergized. The spring 206 opposes the shunt winding 170 and prevents the plunger from remaining near the top of the housing 207 until a decided turn of current would take place in the series winding 51. By this arrangement the plunger 177 will be moved upwardly or downwardly by a steady movement depending upon the decrease or increase of current in the series winding 51, which movement will be more fully described hereinafter.

The throttle 41 is adapted to be set for causing the prime mover 20 during its operation, to drive the dynamo 22 to supply a trickle charge of predetermined value to the battery 45, for example 15 amperes, when there is no load on the line 47. Since the throttle is operatively connected with the plunger 177, the setting of the throttle 41 is made with respect to the balancing point of the plunger 177, which balancing point is affected by the 15 amperes flowing through the series winding 51 which tends to draw the plunger 177 downwardly and the shunt winding 170 tends to oppose the series winding 51 until the plunger is balanced.

When the dynamo 22 is operative to supply a trickle charge of 15 amperes to the battery, the placing of a load demand on the line of approximately 10 amperes for example, will reduce the trickle charge to the battery to approximately 5 amperes since the battery charging circuit and the work circuit are connected in parallel, and because the work circuit offers less resistance than the circuit to the battery. The series winding 51 of the control 43 being connected in the battery charging circuit, a reduction of the trickle charge will reduce the ampere turns of this winding. The shunt winding 170 of control 43, being connected across the battery 45, the ampere turns of this winding will remain substantially constant. By reducing the magnetic strength of the series winding 51 when such load is added across the line, the shunt winding 170 will tend to raise the plunger to a point above the balancing point as previously described. This upward movement of the plunger 177 opens the throttle to such an extent as will cause the prime mover 20 to drive the dynamo 22 to supply current in accordance with the load demand on the line 39 and provide for a proper trickle charge to the battery 45.

If the spring 206 or its equivalent were not provided, and if an increase across the work circuit 47 were applied, the plunger 177 would be raised quickly by the magnet winding 170 opening the throttle to the fullest extent causing the engine to race. Then a heavy current would be impressed on series winding 51 which would tend to close the throttle 41 and decrease the speed of the prime mover. In other words, the flow of current will fluctuate considerably and affect the load across the line and the charge to the battery. The spring 206 resists the upward movement of the plunger 177 so that the speed of the engine is gradually increased to its necessary speed and thus remains at the desired position. The arrangement of the throttle control including the spring 206 is such that the charge to the battery gradually decreases as the load across the line increases, the spring 206 gradually increases its opposing force to the shunt winding 170 as the load on the work circuit increases.

If the load demand on the work circuit 47 is reduced, the trickle charge immediately increases, and the strength of the series winding 51 increases and tends to close the throttle 41 until the speed of the prime mover 20 is just enough to drive the dynamo 22 to furnish the proper trickle charge to the battery and the load demand to the work circuit 47. Thus the series winding 51 opposes the shunt winding 170 to properly regulate the speed of the prime mover 20, the output of the dynamo 22, and the flow of current through the battery charging circuit and the work circuit in accordance with the load demand by the work circuit.

When it is desired to supply charging current to the battery 45 and there is no load demand on the work circuit 47 for rendering the prime mover 20 automatically operative, an actuating or locking device 210 may be manually operated to engage contact 83 with contact 84 to complete the necessary electrical circuits for starting the prime mover. The locking device 210 includes a plunger 211, cross-rod 212 which is pivoted at 213, said cross-rod having an arm 214 secured thereto, and a locking clasp 215. The downward movement of the arm 214 will cause the plunger 211 to urge the armature 82 upwardly to engage contact 83 with contact 84. The locking clasp 215 is adapted to receive the arm 214 to hold the device in position to maintain holding of contacts 84 and 83.

The voltage limiting relay 175 is adapted to automatically operate in response to a predetermined voltage of the battery 45 to place a resistance 178 in series with the shunt winding 170 of the control 43 in order to decrease the speed of the engine when the battery voltage is relatively high. The voltage limiting relay 175 includes the frame 174 having the pivoted armature 173 connected therewith, a magnet coil 179 having its ends connected across the battery 45 and a metal core 191. When the voltage of the battery 45 attains a predetermined high value the current in the coil 179 will magnetize the core 191 sufficiently to draw the pivoted armature 173 upwardly, thereby dis-engaging the armature 173 from the contact 172. The dis-engagement of the armature 173 from the contact 172 places the resistance 178 in series with the shunt winding 170. This resistance 178 tends to decrease the effectiveness of the shunt winding 170 causing the engine to be throttled to a certain extent, and thereby limiting the speed of the prime mover and consequently limit the output of the dynamo 22 and prevent a high voltage from being impressed across the battery and the work circuit.

In the event there is a demand for current of a predetermined value by the work circuit 47, the main control relay 66 is adapted to function to complete a circuit through load switches 220 and 221, and place system "B" in readiness for operation to cooperate with system "A" to supply the current demand. However, system "B" will not be rendered operative until system "A" has become operative, the current necessary for rendering system "B" operative being controlled by the reverse current relay 96 of system "A", which operation is described hereinafter.

System "B" may be the same as system "A" and includes a prime mover 225, dynamo 226, a choke control 227, a throttle control 228, a starting switch relay 229, a starting switch 230, a reverse current relay 231 and a series shorting switch 232, all of which are adapted to function in a like manner as those in system "A". However, the reverse current relay 96 of system "A" is adapted to control the flow of current to the magnet coil 233 of starting switch 230 and to the various other circuits necessary for starting the prime mover 225.

When there is a demand for current of a predetermined value equal to or in excess of the capacity of system "A", the current through the winding 65 of relay 66 will magnetize it sufficiently to draw the armature 235 upwardly to engage contact 236 with contact 237. The closing of contacts 236 and 237 causes the operation of switches 220 and 221. The switch 220 includes magnet coil 239 and an armature 240 which carries a contact 241. The switch 221 includes magnet coil 242 and an armature 243 which carries a contact 244. The circuit from the battery through the magnet coils 239 and 242 is as follows: battery 45, wire 50, series winding 51 of control 43, wire 52, wire 53, wire 54, series winding 65 of main control relay 66, wire 248, contacts 236 and 237, wire 249, to connecting point 250 where the current divides part flowing through magnet coil 242, wire 251, to connecting point 252, the other part of the current from connection point 250 flowing through wire 254, magnet coil 239, wire 255, to connecting point 252 thence over wires 256, 257, 57, series winding 59 of starting switch relay 60 and wires 62 and 63 to the other side of the battery.

The energizing of coil 239 will cause the armature 240 to be drawn upwardly to engage contact 241 with a contact 260. The energizing of coil 242 will cause the armature 243 to be drawn upwardly to engage contact 244 with a contact 262. The closing of contacts 241 and 260 and contacts 244 and 262 will condition the generating circuit of system "B" so that the system "B" will supply current to the work circuit 47 after its prime mover is self-operative.

The closing of contacts 241 and 260 and contacts 244 and 262 will complete a circuit between the battery 45 and the series winding 333 of the starting switch relay 229. The circuit from the battery through the series winding 233 is as follows: battery 45, wire 295, series winding 296 of control 228, wire 297, wire 335, wire 328, contacts 260 and 241, wire 330, wire 54, series winding 65 of control 66, contacts 70 and 71, service main 72, translating devices 73, service main 74, wire 257, contacts 244 and 262, wire 332, series winding 333 of relay 229, wire 334, wire 287, wires 62 and 63 to the other side of the battery. The energizing of series winding 333 will cause the armature 276 to be drawn upwardly to engage contact 274 with contact 273.

After contacts 273 and 274 are closed and system "A" has become self-operative and the reverse current relay has assumed the position whereby contact 192 engages contact 193, the dynamo 22 of system "A" is then adapted to supply current through wire 264 to the various circuits necessary for rendering system "B" operative, including magnet coil 233 of the starting switch 230 of system "B". A circuit from the dynamo 22 to the magnet coil 233 is as follows: the circuit to contact 193 is the same as previously described, thence through wire 264, blade 270, bimetallic blade 271, wire 272, contacts 273 and 274, wire 275, wire 280, magnet coil 233, wire 282, wire 283, series winding 285 of reverse current relay 231, wire 286, wire 287, wire 62, wire 97, series winding 95 of reverse current relay 96, wire 94, contacts 103 and 104 and wire 112 to the other side of the dynamo.

The energizing of magnet coil 233 will cause the armature 290 of the starting switch 230 to be drawn upwardly to engage contact 291 with contact 292. The closing of contacts 291 and 292 complete the cranking circuit of system "B" which is as follows: battery 45, wire 50, wire 295, series winding 296 of throttle control 228, wire 297, wire 298, magnet coil 299 of choke control 227, wire 300, series field winding 302 of dynamo 226, wire 303, dynamo 226, wire 304, contacts 292 and 291, wire 283, series winding 285 of reverse current relay 231, wire 286, wire 287, wire 62, wire 63 to the other side of the battery.

The closing of contacts 192 and 193 also allows current to flow from wire 264 through the following circuit: wire 264, blades 270 and 271, wire 272, contacts 273 and 274, wire 310, side plates 311 of reverse current relay 231, wire 312, contacts 314 and 315, wire 316, wire 318 and through shunt winding 320 of main control relay 66. During cranking of system "B" when there is a heavy demand on the battery 45 the shunt winding 320 functions as a holding coil. When system "B" is cranking the heavy demand on the battery tends to reduce the ampere turns of the series winding 65 of relay 66 and would cause a chattering of contacts 236 and 237 if it were not for the holding coil 320. Current is supplied to the ignition system, and a heating coil of cranking cut-out 321 are supplied as in system "A" and a choke coil 299 is actuated during cranking operation as explained in system "A". After system "B" becomes self-operative the reverse current relay 231 interrupts the flow of current through the holding coil 320, the contacts 236 and 237 then being controlled entirely by the winding 65. The heating coil of cranking cut-out 321, the series field winding 302 and the choke coil 299 are interrupted as the engine is self-operative as explained regarding system "A".

When system "B" becomes self-operative the dynamo 226 functions to cooperate with system "A" to supply current to the translating device 73 contained in the work circuit 47 and to supply charging current to the battery 45. The flow of current from the dynamo 226 to the work circuit is as follows: dynamo 226, wire 325, contacts 326 and 327 closed during this operation, wire 328, contacts 260 and 241, wire 330, wire 54, series winding 65 of main control relay 66, contacts 70 and 71, service main 72, translating device 73, service main 74, wire 257, contacts 244 and 262, wire 332, series winding 333 of starting switch relay 229, wire 334, wire 286, series winding 285 of reverse current relay 231, wire 283, contacts 291 and 292 and wire 304 to the negative side of the dynamo. The flow of current from the dynamo 226 through the battery charging circuit is as follows: dynamo 226, wire 325, contacts 326 and 327, wire 328, wire 335, wire 297, series winding 296 of throttle control 228, wire 295, wire 50, battery 45, wire 63, wire 62, wire 287, wire 286, series winding 285 of reverse current relay 231, wire 283, contacts 291 and 292, wire 304 to the negative side of the dynamo.

In the event that the demand for current by the work circuit 45 is reduced to a predetermined value the current flowing through the series winding 65 of main control relay 66 will be reduced, thereby reducing the ampere turns of this winding and cause the armature 235 to descend by gravity to separate contacts 236 and 237. Thus the circuit through the magnet coils 239 and 242 of the load switches 220 and 221 will be interrupted. This causes the armature of switch 239 to descend by gravity to separate contact 241 from contact 260, likewise the armature 243 of switch 221 will descend by gravity to separate contact 244 from contact 262. By separating contact 241 from contact 260, and contact 244 from contact 262 then system "B" will be rendered inoperative. Thus system "A" will remain operative to supply the demand by the work circuit 47.

It will be noted from the foregoing that current will not be supplied to a heavy load in a work circuit and for cranking of the engines simultaneously, if for example, both engines are idle and a heavy load is applied on the work circuit, current will be supplied first for cranking the prime mover of system "A" and current will not be supplied for cranking the prime mover of system "B" until the prime mover of system "A" is self-operative.

When it is desired to operate system "A" independently of system "B", the blade 271 of the cranking cut-out 321 may be manually moved to the right, as viewed in the drawings, where it will be retained in a shoulder 340 of a non-conducting block 341, which block is carried by the blade 270. The separation of blades 270 and 271 interrupts the flow of current to the various circuits necessary for starting system "B".

When it is desired to operate system "B" independently of system "A" a switch 345 may be manually operated to complete a circuit through the magnet coils 239 and 242 of the load switches 220 and 221, thereby placing the generating circuit of system "B" in readiness for operation to supply current to the work circuit 47. The switch 345 also completes a circuit from the battery 45 through the various circuits necessary for starting system "B". The circuit from the battery 45 through the magnet coils 239 and 242 is as follows: battery 45, wire 50, series winding 51 of throttle control 43, wire 52, wire 53, wire 54, wire 346, blade 348 of switch 345, wire 349, wire 350 to contact point 351, part of the current flows from contact point 351 through wire 352, magnet coil 239, wire 255 to contact point 252, the other part of the current flowing from contact point 351 over wire 254, magnet coil 242 to contact point 252 thence over wire 256 and 257, wire 57, series winding 59, and wires 62 and 63 to the other side of the battery. The circuit from the battery to the switch 345 for supplying current to the various circuits necessary for starting system "B" is as follows: battery 45, wire 50, series winding 51 of throttle control 43, wire 52, wire 53, wire 54, wire 346, blade 348 of switch 345, wire 349, blade 355 of switch 345, wire 356 which is connected to wire 264, the circuit from wire 264 as previously described. In order to prevent system "A" from being started the blade 88 of the cranking cut-out 163 of system "A" may be manually operated to maintain the flanged end 188 of this blade in the shoulder 190 of the non-conducting block 186. This movement of blade 88 interrupts the flow of current to the starting circuit of system "A" as previously described. In the present invention it is necessary only to inter-connect the standard house lighting systems through an auxiliary paralleling switch board which can be sold independently of the standard systems. System "A" and system "B" may be like systems of the house lighting types or they may be systems of different capacity.

The standard system "A" may be connected to the auxiliary board by connecting wire 54, which in the standard house lighting system leads to one of the service mains, to connecting point 357, and connecting wire 57 which in the standard house lighting system leads to the other service main, to connecting point 359. The standard system "B" as shown may be connected to the auxiliary board by the connecting wire 328, which in the standard house lighting system leads to one of the service mains, to contact 260 and connecting wire 332, which in the standard house lighting system leads to the other service main, to contact 262.

A wire 264 of the auxiliary switch board is connected to wire 201 of system "A" and the opposite end is connected to the blade 270 of cranking cut-out 321 of system "B" the wire 264 being joined to the auxiliary board by the wire 356. Wire 318 of the auxiliary board is connected to the wire 316 of system "B".

Thus it is apparent that standard house lighting systems function as sub-systems to operate ordinarily as a single large generating system. It is necessary only to connect the auxiliary paralleling switch board with the house lighting systems.

Another advantage of the present invention is that a certain amount of current is insured even though part of the system is inoperative. If certain of the sub-systems are inoperative the entire generating system will not be ineffective, the sub-systems may be segregated for maintaining the operable sub-systems effective.

From the foregoing it will be apparent that I have provided an electrical generating system which can be operated economically whether a relatively small load or a relatively large load is demanded of the work circuit. By arranging the system in a sub-system manner only a motive power commensurate with the current demand is operated. Furthermore if the demand for current increases other sub-systems are brought into operation automatically, and when the demand decreases the added sub-system or systems are automatically rendered ineffective. Thus the generating system operates efficiently through a wide range of current demands.

While the form of embodiment of the invention as herein disclosed, constitutes a preferred form, it is to be understood that other forms might be adopted, all coming within the scope of the claims which follow.

What is claimed is as follows:

1. In combination, a plurality of electrical generating systems adapted to operate to supply current to a work circuit, means adapted to respond to a demand for current of a predetermined value by the work circuit for rendering the systems operative, and means including a reverse current relay of one of the systems for withholding the flow of starting current to a second system until the first system is self-operative.

2. An electrical generating system comprising, in combination, a prime mover; a work circuit including a coil connected in series therewith; a storage battery; electrical apparatus adapted to operate as a motor for cranking the prime mover and as a generator for supplying current to the work circuit when driven by the prime mover; a switch for controlling the circuit connections between the battery and electrical apparatus; means including said coil responsive to a demand for current by the work circuit for closing the switch; a holding coil; said switch when closed being adapted to complete a circuit between said battery and the holding coil, said holding coil being adapted to assist said first coil in maintaining said switch closed; and means responsive to the self-operation of the prime mover for rendering said holding coil inoperative.

3. An electrical generating system comprising, in combination, a prime mover; a work circuit including a current coil connected in series therewith; a storage battery; electrical apparatus adapted to operate as a motor for cranking the prime mover and as a generator for supplying current to the work circuit when driven by the prime mover; a switch for controlling the circuit connections between the battery and electrical apparatus; means including said current coil responsive to a demand for current of a predetermined value by the work circuit for closing the switch; a holding coil; said switch when closed being adapted to complete a circuit between said battery and the holding coil, said holding coil being adapted to assist said current coil in maintaining said switch closed; and means responsive to the self-operation of the prime mover for rendering said holding coil inoperative.

4. In an electric generating system comprising in combination a work circuit for translating devices, a storage battery for supplying operating current up to a certain value to the translating device or devices in said work circuit, a plurality of sub-generating systems of substantially the same voltage as the voltage of the battery for supplying operating current to the work circuit, each of said sub-generating systems including electrical apparatus for starting its system, means responsive to demand for operating current in said work circuit in excess to said certain value for rendering one of said sub-generating systems operative, means responsive to a demand for current of a predetermined and still greater value by the work circuit for rendering another of said sub-generating systems operative, said first sub-generating system including a reverse current relay operable to render the second sub-generating system operative when the first system is self-operative.

In testimony whereof I hereto affix my signature.

WESLEY E. WENDT.